Patented Feb. 13, 1951

2,541,590

UNITED STATES PATENT OFFICE 2,541,590

LUBRICATING COMPOSITIONS

Robert G. Larsen, Albany, and Kenneth E. Marple, Oakland, Calif., assignors to Shell Development Company, San Francisco, Calif., a corporation of Delaware No Drawing. Application February 13, 1948,
Serial No. 8,277

10 Claims. (Cl. 252—57)

This invention relates to copolymers of allyl-type esters of higher saturated monocarboxylic aliphatic acids with other polymerizable substances, which copolymers are useful as additives for lubricating oils and the like.

The relationship of the change in viscosity of a lubricating oil with change in temperature is commonly expressed by the term "viscosity index" (V. I.), as explained by Dean and Davis in Chemical and Metallurgical Engineering, 36, 618 (1929). Oils having a high viscosity index are preferred for most purposes. The viscosity index of oils may be increased by the addition of certain soluble high molecular weight substances. Not all of these substances are satisfactory in practical use, however. Suitable V. I. improvers must be effective in very small amounts, must bring about a relatively great improvement in V. I. in proportion to the accompanying increase in viscosity, must have a relatively permanent effect, and must be free from objectionable action such as carbonization, etc.

A large body of V. I. improvers consists of high molecular weight hydrocarbons such as rubber, hydrogenated rubber, polyisobutylene and other polymeric olefins. More recently there have come into use acryloid polymers, which are polymeric esters of acrylic and substituted acrylic acids. Substances produced by the polymerization of common unsaturated alcohols and esters of unsaturated alcohols with short chain acids such as polyvinyl acetate, polyallyl acetate, etc. have been found unsuitable. It has been stated that the treatment of many otherwise unsuitable polymeric unsaturated alcohol derivatives with sulfur monochloride renders them useful as lubricating oil additives.

It is an object of the present invention to provide new chemical copolymers useful as lubricating oil additives without sulfurization. Another object is to provide new lubricant compositions. Other objects will be apparent from the description of the invention given hereinafter.

These objects are accomplished in accordance with the present invention by copolymers of esters of allyl alcohols with saturated monocarboxylic aliphatic acids of 8 to 13 carbon atoms, inclusive, and another polymerizable material, as hereinafter defined, and by improved lubricants containing them. Even without treatment with sulfur monochloride or other sulfurization treatment the new copolymers in small amounts are effective in bringing about substantial improvement in the V. I. without proportionately increasing the viscosity of lubricating oils.

The new copolymers have, as a principal constituent thereof, an ester of a real or hypothetical allyl alcohol with saturated monocarboxylic aliphatic acids of 8 to 13 carbon atoms, inclusive. Examples of such acids are caprylic, pelargonic, capric, undecoic, lauric, tridecoic, and the corresponding branched-chain acids. The acids may be substituted by elements or groups such as hydroxy, halogen and the like, although unsubstituted acids are preferred.

Allyl alcohols are compounds having a double bond of aliphatic character between two carbon atoms one of which is attached directly to a saturated carbon atom which in turn is attached directly to an alcoholic hydroxyl group. They may be represented by the general structural formula

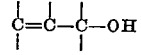

Preferred allyl alcohols have a terminal methylene group attached directly by an olefinic double bond to a carbon atom which in turn is attached directly to a saturated carbinol carbon atom, as represented by the formula

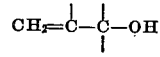

Allyl alcohols useful in the present invention preferably have not more than about eighteen carbon atoms and have at least one unsaturated carbon-to-carbon linkage for each six carbon atoms.

Representative examples of preferred allyl alcohols are the following:

Allyl alcohol
Methallyl alcohol
Ethallyl alcohol
Chloroallyl alcohol
Buten-1-ol-3
Penten-1-ol-3
Hexen-1-ol-3
3-methyl-buten-1-ol-3
3-methyl-penten-1-ol-3
2-methyl-buten-1-ol-3
2-methyl-penten-1-ol-3
2,3-dimethyl-buten-1-ol-3
Hepten-1-ol-3
4-methyl-hexen-1-ol-3
5-methyl-hexen-1-ol-3
4,4'-dimethyl-penten-1-ol-3

Octen-1-ol-3
6-methyl-hepten-1-ol-3
4-methyl-hepten-1-ol-3
4,4'-dimethyl-hexen-1-ol-3
3-phenyl-propen-1-ol-3
3-tolyl-propen-1-ol-3
3-xylyl-propen-1-ol-3
4-phenyl-buten-1-ol-3
4-tolyl-buten-1-ol-3
4-xylyl-buten-1-ol-3
3-naphthyl-propen-1-ol-3
4-chloro-buten-1-ol-3
Pentadien-1,4-ol-3
Hexen-1-yn-5-ol-3
2-methyl-penten-1-yn-4-ol-3
2,5-dimethyl-hexadien-1,5-ol-4

Other allyl alcohols are:

Crotyl alcohol
Tiglyl alcohol
3-chloro-buten-2-ol-1
Cinnamyl alcohol
Hexadien-2,4-ol-1
Hexadien-2,5-ol-1
Butadien-2,3-ol-1

Hexadien-3,5-ol-2
2-methyl-hexen-2-ol-1
2-methyl-penten-2-ol-1
3,7-dimethyl-octadien-2,7-ol-1
Cyclopenten-2-ol-1
Cyclohexen-2-ol-1, etc.

Allyl alcohol is preferred.

Examples of some of the unsaturated esters with which the invention is concerned are allyl caprylate, allyl pelargonate, allyl caprate, allyl laurate, methallyl caprate, methallyl laurate, chloroallyl laurate, (buten-1-yl-3) laurate, (cyclopenten-2-yl-1) laurate, etc. There are, of course, many others. Allyl laurate is preferred.

A variety of materials may be copolymerized with the above-described esters to produce the copolymers of the present invention. Preferred materials are unsaturated esters of aliphatic or aromatic polycarboxylic acids, such as diallyl phthalate, diallyl oxalate, diallyl maleate, divinyl phthalate, and the like. However, other polymerizable materials may be used, such as allyl acrylate, allyl chloroacetate, allyl methacrylate, and their vinyl homologs, such as vinyl acrylate, unsaturated ethers, and the like. Diallyl phthalate is the preferred copolymerizable material.

The monomeric esters used in forming the present copolymers may be produced by a variety of methods. One method comprises the direct esterification of the acid with the alcohol, preferably in the presence of a catalyst such as paratoluene sulfonic acid, a mineral acid or the like. Another method comprises ester-exchange, in which the acid is reacted wtih an ester of an allyl alcohol with another acid, e. g., acetic acid. Another method comprises acid-exchange involving an allyl alcohol and an ester of the acid with another alcohol, e. g., methyl, ethyl, etc., alcohol. Another method comprises ester-interchange, in which an ester of an allyl alcohol with another acid is reacted upon an ester of the acid with another alcohol. Methods of esterification involving the alkenyl halides or the acyl halides may be used. Many other methods of synthesis are suitable. Polymerization inhibitors, such as tannic acid and the like, may be present. In general, those catalysts and conditions which have been found suitable for other esterification reactions may be employed in the production of the present esters. The compounds may be separated from the other ingredients of the reaction mixture and purified by known or special methods.

The monomers are in general colorless liquids. Some of the higher members, e. g., esters of long-chain unsaturated alcohols, may be solids.

The present copolymers may be produced by the copolymerization of an admixture of the corresponding monomers, or by the conversion of polymers of derivatives of the monomers to the desired copolymers. For instance, a polymeric allyl alcohol, which may be produced by the polymerization of an allyl alcohol or by hydrolysis or alcoholysis of an ester or the like, may be esterified by two or more saturated monocarboxylic acids. Preferred copolymers have at least about 50% of the hydroxyl groups of the polymeric allyl-type alcohol esterified with the designated higher acids. It is essential, however, in order to realize the advantages of the present invention, that the above-described esters, namely, the ester of an allyl alcohol with a saturated monocarboxylic acid of from 8 to 13 carbon atoms, be present in the copolymer to the extent of at least about 50% by weight, and preferably about 75% by weight, and generally should not exceed about 97% by weight, but in some instances as much as about 99.5% by weight may be employed.

Copolymerization may be effected by heating in the presence of a polymerization catalyst. Oxygen-containing polymerization catalysts are suitable. Benzoyl peroxide is suitable. Other oxygen-containing catalysts include lauryl peroxide, acetyl peroxide, metallic peroxides, hydrogen peroxide and the like. Tertiary butyl hydroperoxide (often called tertiary butyl peroxide) is effective, as are also di(tertiary alkyl) peroxides, such as di(tertiary butyl) peroxide. Metals and metallic salts are effective. Mixtures of catalysts may be used. From about 0.1 to about 10% of catalyst is generally satisfactory, the more narrow range of from about 1% to about 5% being preferred. Under proper conditions it may be unnecessary to use any catalyst at all.

The temperature used in the co-polymerization is dependent upon the compound or compounds involved, upon the catalyst employed and upon the other conditions under which the reaction is carried out. Temperatures of from about 50° C. to about 300° C. may be used. In the lower temperature range, e. g., from about 50° C. to about 125° C., it may be desirable to use a catalyst such as benzoyl peroxide which is most effective in that range. At higher temperatures, e. g., from about 125° C. to about 300° C., tertiary butyl hydroperoxide, a di(tertiary alkyl) peroxide, or a metallic salt may be more effective.

The reaction may be carried out in a continuous or batchwise manner. Atmospheric or superatmospheric pressures are customary, although in many cases reduced pressures may be employed. The reaction mixture may be provided with a blanket of an inert gas such as nitrogen or carbon dioxide. The reaction can be carried out in bulk (in the absence of diluents), in solution or in dispersion.

The copolymers may be separated from any other ingredients of the polymerization reaction mixture, washed and purified by known or special methods.

The copolymers when pure are substantially colorless. They vary from readily mobile liquids to solid substances. They have molecular weights ranging from a few hundred to several thousand (polymerization degree of 4.3 to 12.1). The lower molecular weight copolymers may be used as lubricating oil additives to reduce corrosion, increase resistance to discoloration, improve the pour point, etc. For use as V. I. improvers, high molecular weight copolymers are preferred.

Lubricants can be produced by the addition of the new copolymers to lubricating oil, greases, waxes and the like. The copolymers may be used with synthetic lubricants comprising polymerization products of unsaturated hydrocarbons such as ethylene, the propylenes, the butylenes, etc. Suitable synthetic lubricants may also be produced by the Friedel-Crafts polymerization of selected hydrocarbon fractions obtained by cracking hydrocarbon waxes, etc. The new copolymers are valuable additives to other lubricating compositions and to oils used for other purposes. Where it is desired merely to improve the V. I. of a lubricant, only relatively small amounts of the copolymers need usually be added, e. g., 5% or less by weight of the lubricant. Amounts as low as about 0.2% may be effective. Where substantial bodying, i. e., increase in viscosity, is required amounts as large as 20% or even more may be used. Larger amounts may be employed with natural or synthetic lubricants in the production of plastic compositions useful as greases.

The employment of these copolymers in lubricating compositions is not limited to their association with petroleum or mineral oils. They may be used in petrolatum, paraffin wax, animal or vegetable oils or the like. They may be used in rolling oils, in tinning oils, in metal forming oils, as components of hydraulic fluids, launching grease, in rust-proofing compositions, etc. They may be used in conjunction with asphalts and the like in the production of roadways, roofing compositions, caulking, etc.

The new copolymers have many other uses. They act as plasticizers for plastics and elastomers. They may be employed in paints, lacquers, enamels and varnishes. They may be used in the production of drying oils.

In place of the copolymers as produced there may be used products obtained by hydrogenation, sulfurization, sulfonation, halogenation, etc. The copolymers may be subjected to partial hydrolysis, acetalization, etc. Separately produced copolymers may be used in admixture with one another or with plastic or elastomeric substances of many kinds. Dyes, pigments, solvents, stabilizers, and other modifiers may be added.

Some of the many ways in which the invention may be practiced are illustrated by the following examples, in which parts are on a weight basis.

Example I

A copolymer of allyl caprate and diallyl phthalate was prepared by copolymerizing 32 parts (91.4%) of allyl caprate with 3 parts (8.6%) of diallyl phthalate in the presence of 0.3 part of benzoyl peroxide by heating at 100° C. for 11 days. Thirty-two parts of the copolymer, having a refractive index (20/D) of 1.4738 was obtained.

The copolymer was dissolved in a synthetic lubricating oil, dioctyl phthalate, to form a 5% and a 10% solution thereof. The viscosities at 100° F. and 210° F., and the V. I. of both the 5% solution and the 10% solution were determined; the results are shown below:

|  | Lube Oil | 5 Per Cent Solution | 10 Per Cent Solution |
| --- | --- | --- | --- |
| Viscosity (centistokes), 100° F | 29.05 | 30.68 | 32.4 |
| Viscosity (centistokes), 210° F | 4.24 | 4.53 | 4.86 |
| V. I. | 12 | 40 | 66 |

Example II

A copolymer of allyl caprate and diallyl phthalate was prepared by copolymerizing 36 parts of allyl caprate with 7 parts of diallyl phthalate in the presence of 0.3 part of benzoyl peroxide substantially as described in Example I, and tested substantially as also therein described. The following results were obtained:

|  | Lube Oil | 5 Per Cent Solution | 10 Per Cent Solution |
| --- | --- | --- | --- |
| Viscosity (centistokes), 100° F | 29.05 | 34.73 | 44.12 |
| Viscosity (centistokes), 210° F | 4.24 | 4.97 | 6.20 |
| V. I. | 12 | 59 | 94 |

Example III

A quantity of a copolymer prepared in accordance with Example I was dissolved in a mineral lubricating oil SAE grade 10 so that a 10% solution was obtained. The resulting composition has excellent lubricating properties and improved V. I.

Example IV

A quantity of a copolymer prepared in accordance with Example II was dissolved in a mineral lubricating oil SAE grade 10 so that a 3-5% solution was obtained. The resulting composition has excellent lubricating properties and improved V. I.

Example V

Two copolymers of allyl-2-ethylhexoate and diallyl phthalate were prepared by copolymerizing 30 parts of allyl-2-ethylhexoate with 3 parts of diallyl phthalate, and 27 parts of allyl-2-ethylhexoate with 5 parts of diallyl phthalate, respectively, in the presence of a minor portion of benzoyl peroxide by heating at 100° C. until copolymerization was achieved.

On dissolving either copolymer in a natural or synthetic lubricating oil, a marked improvement in the V. I., with relatively slight change in viscosity, is observed.

Example VI

Allyl laurate was produced by refluxing under a separating head a mixture of lauric acid, 596 grams, allyl alcohol, 500 cc., benzene 250 cc., and para-toluene sulfonic acid, 2.5 grams. At the end of 3 hours, 68 cc. of water had been removed as a benzene-water azeotrope. The residue was washed with dilute aqueous sodium hydroxide, washed with aqueous sodium chloride, dried over sodium sulfate and distilled. The allyl laurate was collected at between 123.8° C. and 128.2° C. at 2 mm. of mercury pressure. The yield was 79%.

Fifty-one grams of the allyl laurate so prepared was copolymerized with 2.5 grams of diallyl phthalate in the presence of 1 gram of benzoyl peroxide by heating at 70° C.

The resulting copolymer is incorporated in a lubricating oil which thereupon exhibits an increased V. I., or is incorporated in a grease which thereupon exhibits enhanced lubricating and stability properties.

Example VII

A mixture of allyl laurate, 36 grams, diallyl phthalate, 3.6 grams, and benzoyl peroxide, 0.8 gram, was maintained at 70° C. for 30 days. The product was dissolved in benzene, precipitated with methyl alcohol, separated by filtration and purified by distillation. The copolymer was a viscous yellow liquid having a Gardner-Holdt viscosity of $Z_4$ and a refractive index (20/D) of 1.4788.

The copolymer is dissolved in a lubricating oil to improve the V. I.

This is a continuation-in-part of pending application Serial No. 574,816, filed January 26, 1945 which has matured into U. S. Patent 2,441,023.

The invention claimed is:

1. A lubricating composition comprising a major amount of a lubricant of the group consisting of mineral lubricating oil and dioctyl phthalate and a sufficient amount to increase appreciably the viscosity index of said lubricant of a copolymer of from 2 to 25% of a diester formed between phthalic acid and an unsaturated aliphatic alcohol having from 2 to 3 carbon atoms and from 97% to 75% of an ester of an allyl alcohol containing 3 to 18 carbon atoms with a saturated monocarboxylic acid of from 8 to 13 carbon atoms, said copolymer having a degree of polymerization of 4.3 to 12.1, obtained by heating and polymerizing said mixture at 50° C. to 300° C. in the presence of a polymerizing catalyst of the group consisting of organic peroxides and metallic salts.

2. A composition according to claim 1 wherein the phthalic acid ester is diallyl phthalate.

3. A composition according to claim 1 wherein the phthalic acid ester is divinyl phthalate.

4. A composition according to claim 1 wherein the lubricant is a mineral lubricating oil.

5. A lubricating composition comprising a hydrocarbon lubricating oil and a sufficient amount to increase appreciably the viscosity index of said hydrocarbon lubricating oil of a copolymer of from 3% to 25% of diallyl phthalate and from 97% to 75% of allyl laurate, said copolymers having a degree of polymerization of 4.3 to 12.1, being obtained by heating and polymerizing said mixture at 50° C. to 300° C. in the presence of benzoyl peroxide.

6. A lubricating composition comprising a hydrocarbon and a sufficient amount to increase appreciably the viscosity index of said hydrocarbon of a copolymer of from 3% to 25% of diallyl phthalate and from 97% to 75% of allyl-2-ethylhexoate, said copolymers having a degree of polymerization of 4.3 to 12.1, being obtained by heating and polymerizing said mixture at 50° C. to 300° C. in the presence of benzoyl peroxide.

7. A lubricating composition comprising a hydrocarbon and a sufficient amount to increase appreciably the viscosity index of said hydrocarbon of a copolymer of from 3% to 25% of diallyl phthalate and from 97% to 75% of allyl caprate, said copolymers having a degree of polymerization of 4.3 to 12.1, being obtained by heating and polymerizing said mixture at 50° C. to 300° C. in the presence of benzoyl peroxide.

8. A lubricating composition comprising dioctyl phthalate and a sufficient amount to increase appreciably the viscosity index of said dioctyl phthalate of a copolymer of from 3% to 25% of diallyl phthalate and from 97% to 75% of allyl laurate, said copolymers having a degree of polymerization of 4.3 to 12.1, being obtained by heating and polymerizing said mixture at 50° C. to 300° C. in the presence of benzoyl peroxide.

9. A lubricating composition comprising dioctyl phthalate and a sufficient amount to increase appreciably the viscosity index of said dioctyl phthalate of a copolymer of from 3% to 25% of diallyl phthalate and from 97% to 75% of allyl-2-ethylhexoate, said copolymers having a degree of polymerization of 4.3 to 12.1, being obtained by heating and polymerizing said mixture at 50° C. to 300° C. in the presence of benzoyl peroxide.

10. A lubricating composition comprising dioctyl phthalate and a sufficient amount to increase appreciably the viscosity index of said dioctyl phthalate of a copolymer of from 3% to 25% of diallyl phthalate and from 97% to 75% of allyl caprate, said copolymers having a degree of polymerization of 4.3 to 12.1, being obtained by heating and polymerizing said mixture at 50° C. to 300° C. in the presence of benzoyl peroxide.

ROBERT G. LARSEN.
KENNETH E. MARPLE.

REFERENCES CITED

The following references are of record in the file of this patent:

UNITED STATES PATENTS

| Number | Name | Date |
|---|---|---|
| 2,091,627 | Bruson | Aug. 31, 1937 |
| 2,106,247 | Gleason | Jan. 25, 1938 |
| 2,339,058 | D'Alelio | Jan. 11, 1944 |
| 2,441,023 | Larsen | May 4, 1948 |
| 2,461,301 | Tawney | Feb. 8, 1949 |